United States Patent
Posamentier (10) Patent No.: US 8,547,360 B2
(45) Date of Patent: Oct. 1, 2013

(54) CAPACITIVE TOUCH SCREEN SENSING AND ELECTRIC FIELD SENSING FOR MOBILE DEVICES AND OTHER DEVICES

(75) Inventor: Joshua Posamentier, Oakland, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 270 days.

(21) Appl. No.: 13/179,135

(22) Filed: Jul. 8, 2011

(65) Prior Publication Data

US 2013/0009906 A1      Jan. 10, 2013

(51) Int. Cl.
*G06F 3/045* (2006.01)

(52) U.S. Cl.
USPC ...... 345/174; 345/173; 178/18.06; 178/19.03

(58) Field of Classification Search
USPC ........... 345/173, 174, 179; 178/18.06, 18.07, 178/19.03
See application file for complete search history.

(56) References Cited

U.S. PATENT DOCUMENTS

| | | | |
|---|---|---|---|
| 4,556,871 A * | 12/1985 | Yoshikawa et al. | 341/26 |
| 4,931,740 A | 6/1990 | Hassanzadeh et al. | |
| 4,943,889 A | 7/1990 | Ohmatoi | |
| 7,030,860 B1 | 4/2006 | Hsu et al. | |
| 7,161,486 B2 | 1/2007 | Care | |
| 7,202,859 B1 | 4/2007 | Speck et al. | |
| 7,339,381 B2 | 3/2008 | Van Berkel | |
| 7,764,274 B2 | 7/2010 | Westerman et al. | |
| 2006/0161871 A1* | 7/2006 | Hotelling et al. | 715/863 |
| 2008/0007539 A1* | 1/2008 | Hotelling | 345/173 |
| 2008/0042985 A1* | 2/2008 | Katsuhito et al. | 345/173 |
| 2008/0100572 A1* | 5/2008 | Boillot | 345/158 |
| 2009/0009483 A1* | 1/2009 | Hotelling et al. | 345/173 |
| 2010/0004029 A1* | 1/2010 | Kim | 455/566 |
| 2010/0031174 A1* | 2/2010 | Kim | 715/764 |
| 2010/0060593 A1* | 3/2010 | Krah | 345/173 |
| 2010/0085324 A1* | 4/2010 | Noguchi et al. | 345/174 |
| 2010/0110040 A1* | 5/2010 | Kim et al. | 345/174 |
| 2010/0164900 A1 | 7/2010 | Lin | |
| 2010/0253638 A1* | 10/2010 | Yousefpor et al. | 345/173 |
| 2010/0277427 A1* | 11/2010 | Watanabe et al. | 345/173 |
| 2010/0289774 A1* | 11/2010 | Pan et al. | 345/175 |
| 2011/0007030 A1* | 1/2011 | Mo et al. | 345/174 |
| 2011/0012840 A1* | 1/2011 | Hotelling et al. | 345/173 |
| 2011/0074725 A1* | 3/2011 | Westerman et al. | 345/174 |

(Continued)

OTHER PUBLICATIONS

"Projected Capacitive Touch Screen", www.amtouch.com.tw/products/projected-capacitive-touch-screen/, 7 pages, 2011.

(Continued)

*Primary Examiner* — Joe H Cheng

(74) *Attorney, Agent, or Firm* — Eugene C. Conser; W. James Brady; Frederick J. Telecky, Jr.

(57) ABSTRACT

A system includes a touch screen having multiple electrodes. The system also includes a processing unit configured to use the electrodes to (i) detect an object contacting the touch screen or within a first distance from the touch screen in a first mode and (ii) detect the object within a second distance from the touch screen in a second mode. The second distance is larger than the first distance. The processing unit can be configured to use the multiple electrodes in the first mode to perform capacitive touch screen sensing. The processing unit can also be configured to use the multiple electrodes in the second mode to perform electric field sensing.

12 Claims, 4 Drawing Sheets

(56) References Cited

U.S. PATENT DOCUMENTS

2011/0096025 A1    4/2011   Slobodin et al.
2011/0138336 A1*   6/2011   Kim .............................. 715/848
2011/0242042 A1*  10/2011   Xu ................................ 345/174
2012/0092270 A1*   4/2012   Lyon et al. .................... 345/173
2012/0111491 A1*   5/2012   Huang et al. ................. 156/247
2012/0293451 A1*  11/2012   Van Schyndel et al. ...... 345/174

OTHER PUBLICATIONS

"Cypress's New Hover Detection for TrueTouch Touchscreen Solution Indicates Where a Finger Will Touch as It Approaches Screen", Cypress Semiconductor Corporation, Apr. 20, 2010, 2 pages.

* cited by examiner

CAPACITIVE TOUCH SCREEN SENSING AND ELECTRIC FIELD SENSING FOR MOBILE DEVICES AND OTHER DEVICES

TECHNICAL FIELD

This disclosure is generally directed to touch screen user interfaces. More specifically, this disclosure is directed to capacitive touch screen sensing and electric field sensing for mobile devices and other devices.

BACKGROUND

Many modern electronic devices include touch-sensitive screens (referred to as "touch screens"), which represent graphical displays that receive input through contact with users' fingers, styluses, or other input mechanisms. In a conventional capacitive touch screen, a person's finger or other object serves as a floating plate between two electrodes. Electrical coupling between the electrodes caused by the object can be detected and used to determine the location of the object on the touch screen. These types of systems can detect actual physical contact with a touch screen, and some systems can even detect when an object is very close to the surface of a touch screen (such as within one or two centimeters of the touch screen).

Longer-range or far-field electric field detection systems can be used to detect the presence of a person or other object at farther distances (such as one to two feet). These types of systems typically have a much lower resolution than conventional touch screens. In order to provide both capacitive touch screen sensing and electric field sensing in the same conventional device, the device would require one system for capacitive touch screen sensing and a separate system for electric field sensing.

BRIEF DESCRIPTION OF DRAWINGS

For a more complete understanding of this disclosure and its features, reference is now made to the following description, taken in conjunction with the accompanying drawings, in which.

DETAILED DESCRIPTION

FIG. 1 through 4, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
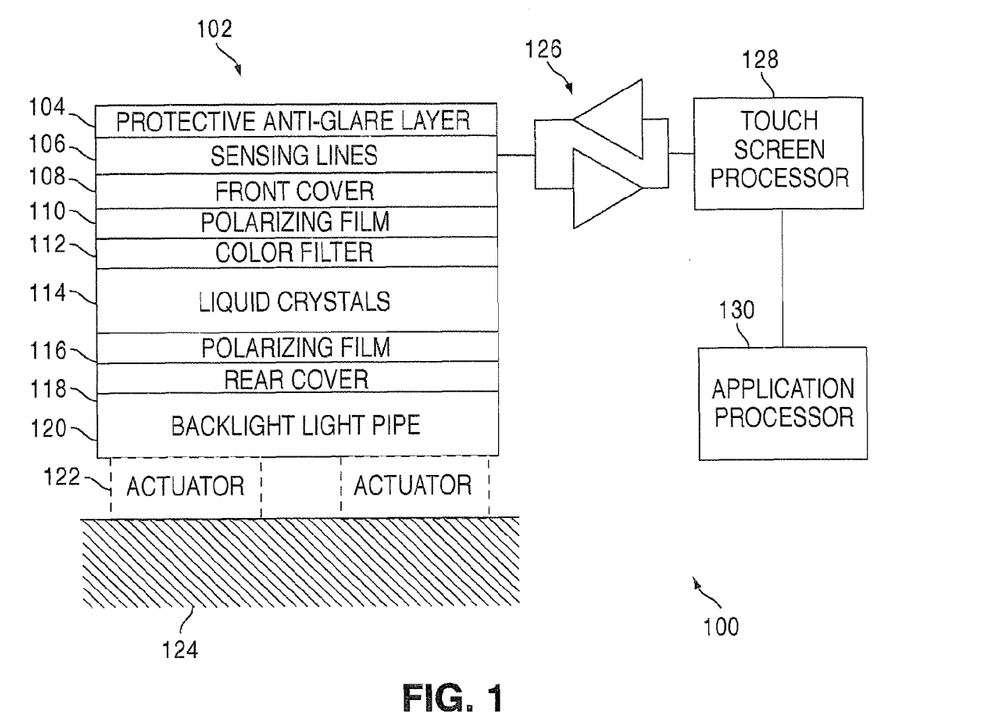
FIG. 1 illustrates an example system supporting capacitive touch screen sensing and electric field sensing in accordance with this disclosure.

FIG. 1 illustrates an example system 100 supporting capacitive touch screen sensing and electric field sensing in accordance with this disclosure. As shown in FIG. 1, the system 100 includes a touch screen 102. The touch screen 102 generally represents a graphical display that receives input through contact with one or more external objects. The external objects could include a user's finger(s), a stylus, or any other suitable object(s).

The touch screen 102 could form part of any larger device or system. For instance, the touch screen 102 could form part of a mobile communication or computing device, such as a mobile telephone, a smartphone, or a personal digital assistant. The touch screen 102 could also form part of a vehicle navigation system, a portable computer or tablet device, or a gaming device. The touch screen 102 could further form part of a large liquid crystal display (LCD) or other display screen. This represents only some of the ways in which the touch screen 102 can be used.

Figure 2:
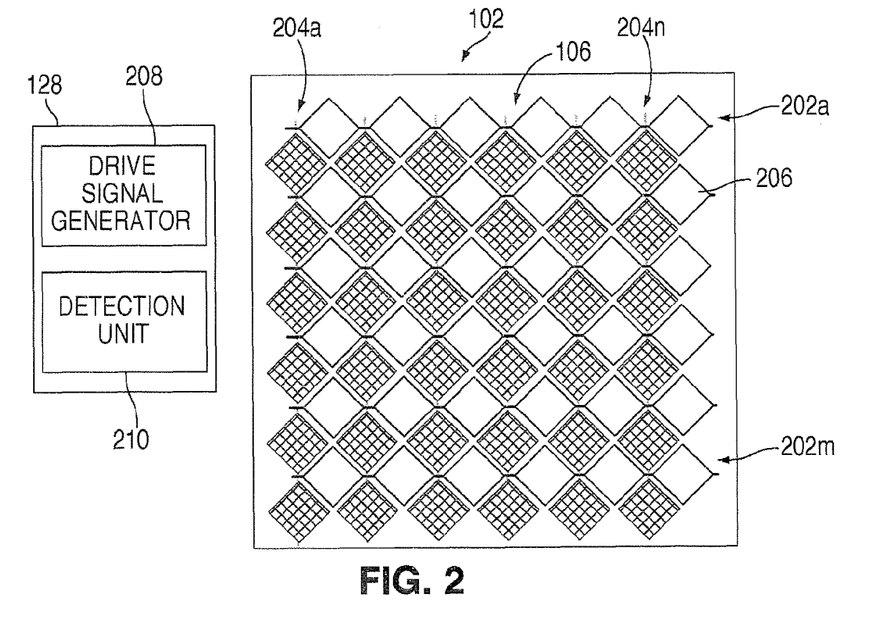
FIG. 2 illustrates additional details of an example system supporting capacitive touch screen sensing and electric field sensing in accordance with this disclosure.

In this example, the touch screen 102 includes a touch interface that is formed by a protective anti-glare layer 104 and sensing lines 106. The anti-glare layer 104 helps to reduce glare on the touch screen 102 while protecting the underlying structures. The sensing lines 106 are used to help identify one or more locations where the touch screen 102 is physically contacted by a user. As described in more detail below, the sensing lines 106 could also be used during electric field sensing. The sensing lines 106 could, for example, include capacitive electrodes arranged in rows and columns. One example of the sensing lines 106 is shown in FIG. 2, which is described below. The sensing lines 106 are typically transparent or substantially transparent to visible light.

The touch screen 102 also includes a display formed by a front cover 108, a polarizing film 110, an optional color filter 112, liquid crystals 114, a polarizing film 116, a rear cover 118, and a backlight light pipe 120. The front cover 108 and the rear cover 118 provide support for and encase other structures of the display. The front cover 108 and the rear cover 118 can be formed from any suitable material(s), such as glass. The polarizing films 110 and 116 polarize light passing through the touch screen 102, and often the films 110 and 116 have perpendicular transmission axes. The color filter 112 can filter particular colors from light passing through the touch screen 102. The color filter 112 may be omitted, however, such as when the touch screen 102 supports field sequential color (FSC). The liquid crystals 114 represent molecules that can be realigned to control the passage of light between the polarizing films 110 and 116. The backlight light pipe 120 provides light from an external source (such as one or more light emitting diodes) to the touch screen 102.

Each of the structures in the touch screen 102 could be formed from any suitable material(s) and in any suitable manner. Also, each of the structures in the touch screen 102 could have any suitable size, shape, and dimensions. Note that the structures in the touch screen 102 shown in FIG. 1 are not drawn to scale.

The touch screen 102 could optionally include or be mounted on one or more actuators 122, which can be mounted on a mechanical connection 124. The actuators 122 represent structures that can vibrate, bend, sheer, or otherwise create movement that can be perceived by a user through the touch screen 102. Because of this, the actuators 122 can be used to provide haptic feedback to the user through the touch screen 102. Each of the actuators 122 includes any suitable structure for creating movement of at least a portion of a touch screen. Each of the actuators 122 could, for example, include a strip of ceramic or other piezo-electric material(s). Also, any suitable arrangement of actuators 122 could be used. The connection 124 includes any suitable mechanism for mechanically connecting the actuators 122 to a case, printed circuit board, or other structure. Note, however, that the actuators 122 could be mounted directly on a case, printed circuit board, or other structure in a mobile telephone or other device. Also note that the actuators 122 could be omitted if haptic feedback is not desired or required.

In this example, the sensing lines 106 of the touch interface are coupled via drivers 126 to a touch screen processor 128. The drivers 126 allow the touch screen processor 128 to drive the sensing lines 106 and receive signals through the sensing lines 106. The touch screen processor 128 analyzes the signals from the touch interface to identify any location(s) where the touch screen 102 is being touched, as well as to identify when the touch screen 102 is likely about to be touched. For example, the touch screen processor 128 could perform capacitive touch screen sensing to identify the location(s) where the touch screen 102 is being touched or to detect the presence of an object at shorter range (such as one to two centimeters) near the touch screen 102. The touch screen processor 128 can also perform electric field sensing to detect the presence of an object at longer range (such as one to two feet) from the touch screen 102.

The touch screen processor 128 includes any suitable structure for identifying information related to how a touch screen is being contacted or is about to be contacted. The touch screen processor 128 could, for instance, include a microprocessor, microcontroller, digital signal processor (DSP), field programmable gate array (FPGA), or application specific integrated circuit (ASIC). In some embodiments, the touch screen processor 128 executes software or firmware instructions to provide the desired functionality. Each of the drivers 126 includes any suitable structure for driving signals to an intended destination.

The touch screen processor 128 can output information about the location of an object to an application processor 130. The application processor 130 can execute one or more applications to provide any desired functionality. For example, when used in a mobile communication device, the application processor 130 could use the identified location(s) of contact on the touch screen 102 to initiate or accept telephone calls, send or view instant messages, allow a user to surf the Internet or play games, or any other of a wide variety of functions. Other or additional functions could be invoked in a mobile communication device or any other device using the system 100. The application processor 130 includes any suitable structure for executing one or more applications. The application processor 130 could, for instance, include a microprocessor, microcontroller, DSP, FPGA, or ASIC.

As noted above, the system 100 supports both capacitive touch screen sensing and electric field sensing. Unlike conventional systems, however, the system 100 supports both of these functions using the same components of the touch screen 102. This allows the system 100 to identify both (i) objects contacting or near the touch screen 102 and (ii) objects approaching the touch screen 102 at farther distances.

The ability to perform both operations can enable a wide variety of features. For example, the system 100 could detect an object approaching the touch screen 102 and automatically display images on the display screen before the touch screen 102 is contacted. This may allow, for example, a vehicle navigation system to automatically display images without requiring a driver to contact the screen. This may also allow a large LCD or other display screen in an office building or other location to begin showing help information or other information when a user approaches the display screen. This represents only some of the ways in which capacitive touch screen sensing and electric field sensing can be used.

Although FIG. 1 illustrates one example of a system 100 supporting capacitive touch screen sensing and electric field sensing, various changes may be made to FIG. 1. For example, the functional division shown in FIG. 1 is for illustration only. Various components in FIG. 1 could be rearranged, omitted, combined, or further subdivided and additional components could be added according to particular needs. As a specific example, the touch screen processor 128 and the application processor 130 could be combined into a single processing unit. In that case, the combined processing unit could identify locations of objects on or around the touch screen 102 and perform various actions based on that knowledge. Also, the system 100 could be used in any suitable larger device or system.

FIG. 2 illustrates additional details of an example system 100 supporting capacitive touch screen sensing and electric field sensing in accordance with this disclosure. In particular, FIG. 2 illustrates additional details of the sensing lines 106 within the touch screen 102 and the touch screen processor 128.

As shown in FIG. 2, the capacitive sensing lines 106 include electrodes that are arranged in rows and columns. In particular, electrodes 202a-202m are arranged in rows horizontally across the touch screen 102, and electrodes 204a-204n are arranged in columns vertically across the touch screen 102.

Each of the electrodes 202a-202m and 204a-204n is formed by multiple conductive pads 206, which represent conductive plates or other structures. Multiple (unhatched) pads 206 are electrically coupled horizontally to form each electrode 202a-202m, and multiple (cross-hatched) pads 206 are electrically coupled vertically to form each electrode 204a-204n.

Each of the electrodes 202a-202m and 204a-204n could include any number of pads 206. Also, each pad 206 could be formed from any suitable conductive material(s). Further, each pad 206 could have any suitable size and shape. In addition, the electrodes 202a-202m and 204a-204n and their pads 206 could be formed in any suitable manner. For instance, one or more layers of conductive material(s) (such as indium tin oxide) could be deposited on the front cover 108 of the touch screen 102.

As noted above, the system 100 supports both capacitive touch screen sensing and electric field sensing. To support these functions, the touch screen processor 128 includes a drive signal generator 208 and a detection unit 210. The drive signal generator 208 generates drive signals that are provided to one or more of the electrodes 202a-202m and 204a-204n. The detection unit 210 receives signals from one or more of the electrodes 202a-202m and 204a-204n and uses the signals to perform capacitive touch screen sensing and electric field sensing.

The drive signal generator 208 includes any suitable structure for generating a drive signal for one or more electrodes. The drive signal generator 208 could, for example, include a voltage source, a current source, or other circuitry for generating a drive signal having a specified waveform. The detection unit 210 includes any suitable structure for analyzing signals to perform capacitive touch screen sensing and electric field sensing. The detection unit 210 could, for instance, include an analog-to-digital converter for digitizing incoming signals and a processing unit for analyzing the digitized signals.

To support both capacitive touch screen sensing and electric field sensing, the number of electrodes driven by the drive signal generator 208 varies, and the number of electrodes measured by the detection unit 210 varies. In general, fewer electrodes are driven and measured during capacitive touch screen sensing, and more electrodes are driven and measured during electric field sensing. Also, the type of capacitive measurements taken by the detection unit 210 varies. Mutual capacitance measurements are taken during capacitive touch screen sensing, and self-capacitance measurements are taken during electric field sensing.

In some embodiments, during capacitive touch screen sensing, the drive signal generator 208 provides a drive signal to a single electrode 202a-202m, 204a-204n. Also, in some embodiments, the detection unit 210 measures an incoming signal on a single electrode 202a-202m, 204a-204n that is immediately adjacent to the electrode being driven. In these embodiments, the detection unit 210 uses the incoming signal to take a mutual capacitance measurement involving the two electrodes. An object at or around the electrode being driven can be detected as a capacitance using the electrode being measured. By taking rapid mutual capacitance measurements involving different pairs of electrodes in both the horizontal and vertical directions, the touch screen processor 128 can rapidly determine the location of one or more objects on (or possibly very near) the surface of the touch screen 102.

In some embodiments, during electric field sensing, the drive signal generator 208 provides a drive signal to a group of electrodes 202a-202m, 204a-204n. Any number of electrodes could be driven, such as when the drive signal generator 208 drives groups of two, four, six, or eight electrodes. The number of electrodes being driven could vary based on a number of factors, including the electrical characteristics of the electrodes. The amplitude of the drive signal can also be varied to achieve a desired range for the electric field sensing. In these embodiments, the detection unit 210 uses self-capacitance measurements during electric field sensing. This means that the detection unit 210 measures signals on the same electrodes that are being driven by the drive signal generator 208. The capacitance of those electrodes is used as a self-capacitance measurement. An object approaching the touch screen 102 can be detected using changes in the self-capacitance of the electrodes being driven.

This allows the system 100 to achieve effective measurement of both near-field and far-field objects. Moreover, this can be accomplished using common components, rather than requiring separate capacitive touch screen sensing and electric field sensing systems. This helps to lower the cost and size requirements for systems implementing capacitive touch screen sensing and electric field sensing. In addition, this approach can be retrofitted into many conventional devices or systems. For instance, a touch screen processor 128 in an existing device that already performs capacitive touch screen sensing could be reprogrammed to drive multiple electrodes at once and take self-capacitance measurements in order to enable electric field sensing.

Note that the touch screen processor 128 could implement any conventional, proprietary, or other technique for performing capacitive touch screen sensing operations. Example capacitive touch screen sensing operations could involve the use of triangle/sawtooth drive signals or radio frequency (RF) signals. The touch screen processor 128 could also implement any conventional, proprietary, or other technique for performing electric field sensing operations. An example electric field sensing operation could involve the use of electrostatic sensing. The specific electric field sensing operations performed could vary depending on the use of the system 100. In other words, the performance of both capacitive touch screen sensing and electric field sensing using common components is not limited to any specific capacitive touch screen sensing technique or to any specific electric field sensing technique. Any suitable drive signals can be used for the capacitive touch screen sensing and electric field sensing operations.

In addition, the system 100 can switch between capacitive touch screen sensing and electric field sensing operations in accordance with any suitable scheme. For instance, the system 100 could rapidly switch back and forth between capacitive touch screen sensing and electric field sensing. The system 100 could also perform electric field sensing until an object is sensed approaching the touch screen 102, at which point the system 100 could perform capacitive touch screen sensing until no touches are detected for a specified period of time. Any other combination of capacitive touch screen sensing and electric field sensing operations could be used in the system 100.

Note that the phrases "near-field" and "far-field" used here are meant to distinguish different distances or distance ranges, where capacitive touch screen sensing is used for near-field and electric field sensing is used for far-field. No specific distances or distance ranges are implied here, and different applications of the system 100 could have different near-field and far-field definitions. For instance, near-field could mean one to two centimeters for a mobile telephone (like the APPLE IPHONE), one to two inches for a tablet computer (like the APPLE IPAD), and greater distances for a large LCD display screen. Similarly, far-field could mean more than one inch for a mobile telephone, more than two inches for a tablet computer, and even greater distances for a large LCD display screen. Also note that "near-field" and "far-field" could overlap slightly, such as when the farther end of a near-field range overlaps with the closer end of a far-field range.

Although FIG. 2 illustrates additional details of one example of a system 100 supporting capacitive touch screen sensing and electric field sensing, various changes may be made to FIG. 2. For example, the functional division shown in FIG. 2 is for illustration only. Various components in FIG. 2 could be rearranged, omitted, combined, or further subdivided and additional components could be added according to particular needs. As a specific example, the drive signal generator 208 and the detection unit 210 could be implemented as separate functional units. Also, any other suitable sensing lines 106 having any suitable arrangement of electrodes could be used.

Figure 3A:
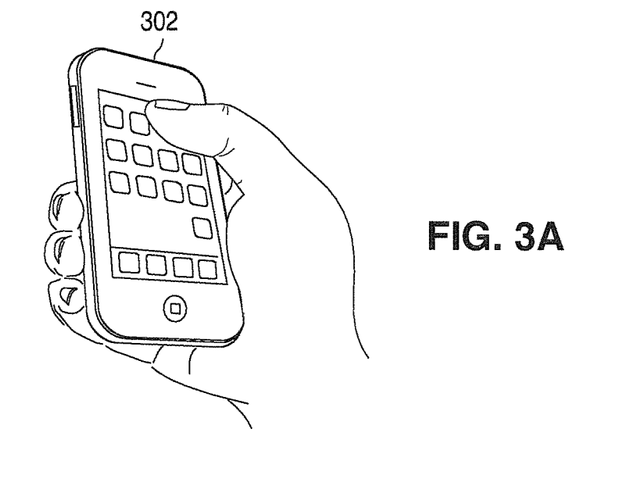
FIGS. 3A through 3F illustrate example devices incorporating capacitive touch screen sensing and electric field sensing in accordance with this disclosure.
Figure 3B:
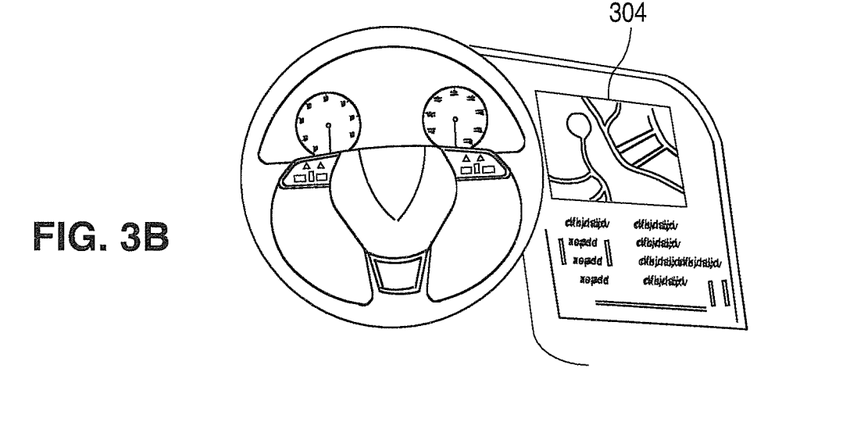
Figure 3C:
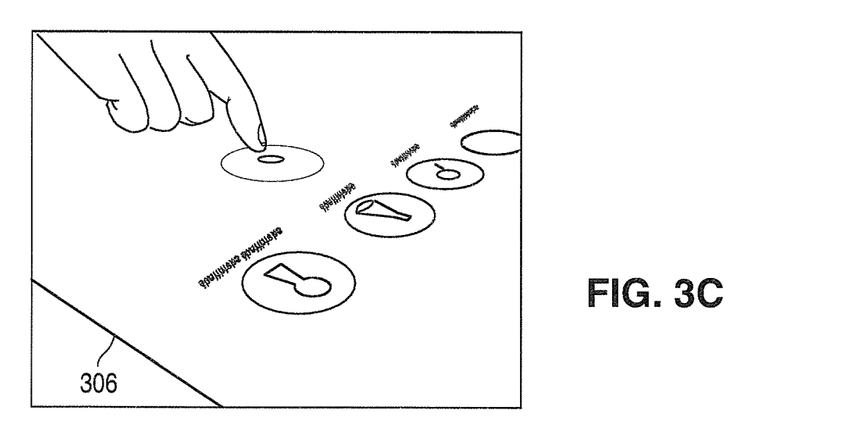
Figure 3D:
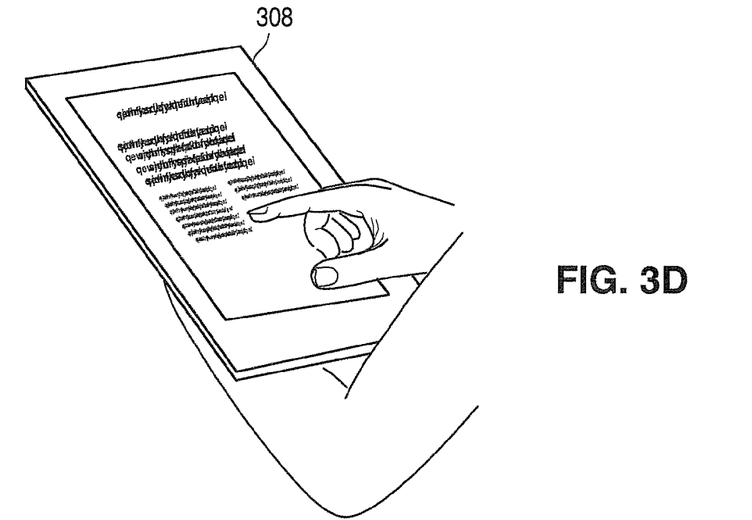
Figure 3E:
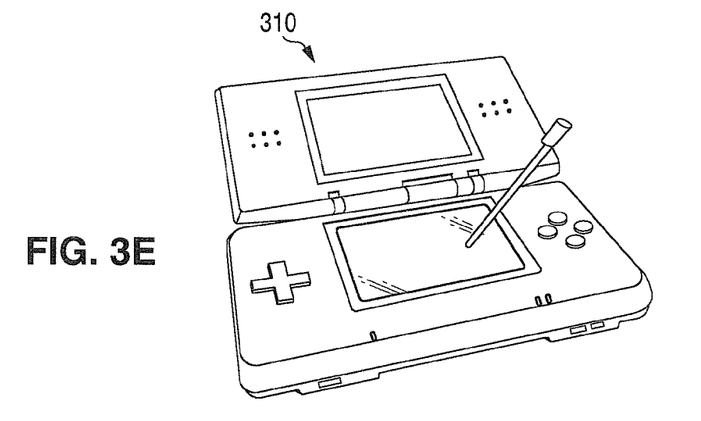
Figure 3F:
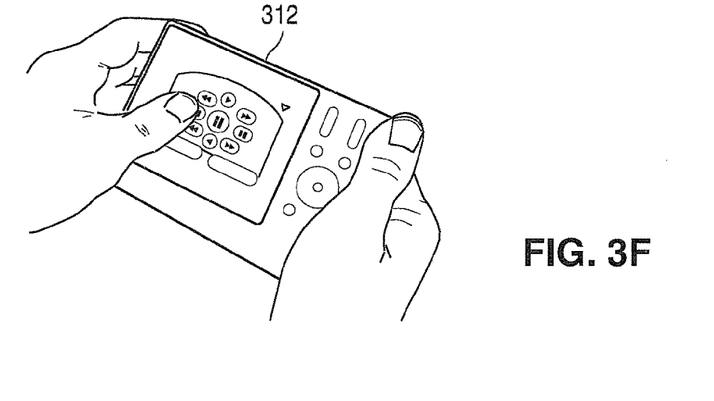

FIGS. 3A through 3F illustrate example devices incorporating capacitive touch screen sensing and electric field sensing in accordance with this disclosure. In general, the system 100 shown in FIG. 1 (or any suitable modified version thereof) could be used in any suitable device or system to support user interaction. For example, the system 100 could be used in a handheld user device 302 as shown in FIG. 3A. In this example, the user device 302 represents an APPLE IPHONE, although any other mobile telephone, personal digital assistant, or mobile device could incorporate the system 100. The system 100 could also be used in a vehicle navigation system 304 as shown in FIG. 3B. Other example uses include a surface computing device 306 as shown in FIG. 3C (such as a table having a touch screen as a top surface or a large LCD or other display) or a tablet device 308 as shown in FIG. 3D (such as an e-book reader or tablet computer like the AMAZON KINDLE or an APPLE IPAD). In addition, the system 100 could be used in a portable gaming device 310 as shown in FIG. 3E (such as a NINTENDO DS or SONY PSP) or a portable media player, touch screen remote control, or other consumer electronic device 312 as shown in FIG. 3F.

Although FIGS. 3A through 3F illustrate examples of devices incorporating capacitive touch screen sensing and electric field sensing, various changes may be made to FIGS. 3A through 3F. For example, these merely represent examples of the types of devices in which capacitive touch screen sensing and electric field sensing can be used with a touch screen. The system 100 could be used with any other suitable device.

Figure 4:
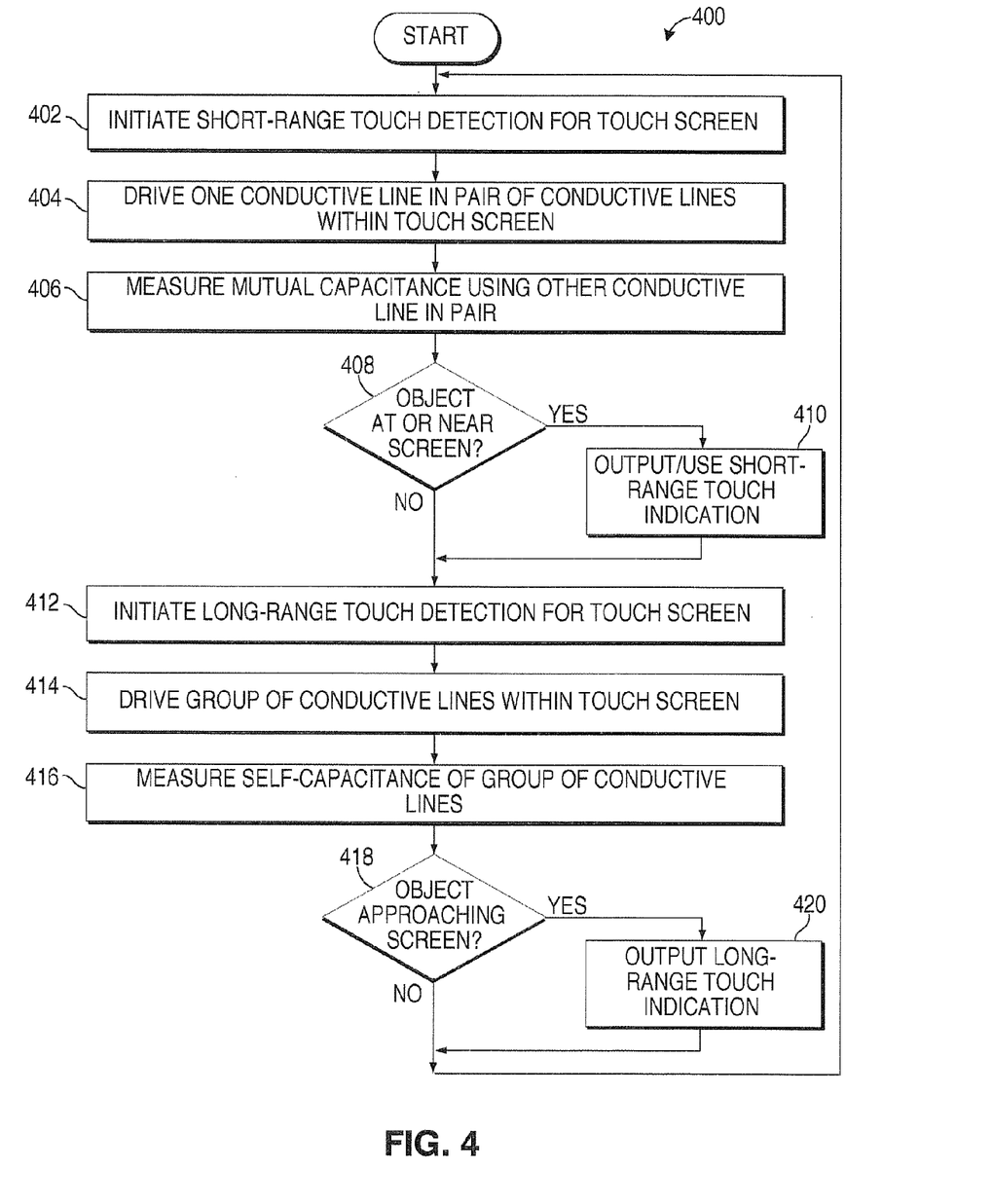
FIG. 4 illustrates an example method for capacitive touch screen sensing and electric field sensing in accordance with this disclosure.

FIG. 4 illustrates an example method 400 for capacitive touch screen sensing and electric field sensing in accordance with this disclosure. As shown in FIG. 4, short-range touch detection for a touch screen is initiated at step 402. This could include, for example, the touch screen processor 128 entering a mode where it attempts to determine whether at least one object is touching the touch screen 102 or is near the touch screen 102. In this mode, one conductive line in a pair of conductive lines within the touch screen is driven at step 404, and a mutual capacitance is measured using the other conductive line in the pair of conductive lines at step 406. This could include, for example, the drive signal generator 208 applying a drive signal to one of the electrodes 202a-202m and 204a-204n and the detection unit 210 measuring a signal on an adjacent electrode. Note that steps 404-406 can be repeated numerous times, such as once for each pair of electrodes in the sensing lines 106. A determination is made whether an object is detected at or near the touch screen at step 408. This could include, for example, the touch screen processor 128 determining whether the mutual capacitance measurements indicate that an object is present. If so, a short-range touch indicator is output or otherwise used at step 410. This could include, for example, the touch screen processor 128 outputting the location of an object on or near the touch screen 102 to the application processor 130.

Long-range touch detection for the touch screen is initiated at step 412. This could include, for example, the touch screen processor 128 entering a mode where it attempts to determine whether at least one object is approaching the touch screen 102 at a larger distance. In this mode, a group of conductive lines within the touch screen is driven at step 414, and a self-capacitance of the group of conductive lines is measured at step 416. This could include, for example, the drive signal generator 208 applying a drive signal to multiple electrodes 202a-202m and 204a-204n and the detection unit 210 measuring a signal on those same electrodes. A determination is made whether an object is approaching the touch screen at step 418. This could include, for example, the touch screen processor 128 determining whether the self-capacitance measurements indicate that an object is approaching the touch screen 102. If so, a long-range touch indicator is output or otherwise used at step 420. This could include, for example, the touch screen processor 128 outputting an indication of an approaching object to the application processor 130.

Although FIG. 4 illustrates one example of a method 400 for capacitive touch screen sensing and electric field sensing, various changes may be made to FIG. 4. For example, while shown as a series of steps, various steps in FIG. 4 could overlap, occur in parallel, occur in a different order, or occur multiple times. As a particular example, each group of steps 402-410 and steps 412-420 could occur at any suitable interval, and the group of steps 412-420 need not always follow the group of steps 402-410. As noted above, the switching between short-range/near-field sensing and long-range/far-field sensing could occur in any suitable manner.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a touch screen comprising multiple electrodes;
   a touch screen processor comprising:
      a drive signal generator, wherein the drive signal generator is configured to provide touch screen or electric field sensing drive signals to one or more of the electrodes;
      a detections unit, wherein the detection unit receives signals from one or more of the electrodes and is configured to analyze the signals received from one or more of the electrodes and perform capacitive touch screen sensing and electric field sensing;
   wherein the touch screen processor is configured to use the drive signal generator and the detection unit to:
      detect an object contacting the touch screen or within a first distance from the touch screen in a first mode; and
      detect the object within a second distance from the touch screen in a second mode, the second distance larger than the first distance;
   wherein the first mode is configured for:
      each of multiple pairs of electrodes, drive one of the electrodes in the pair and measure a mutual capacitance using another of the electrodes in the pair; and
      use mutual capacitance measurements to detect the object contacting the touch screen or within the first distance from the touch screen; and
   wherein the second mode is configured to:
      drive a first group of the electrodes and measure a self-capacitance of the group of electrodes; and
      use self-capacitance measurements on the first group of electrodes to detect the object within the second distance from the touch screen.

2. The system of claim 1, wherein the touch screen processor is configured to:
   use the multiple electrodes in the first mode to perform capacitive touch screen sensing; and
   use the multiple electrodes in the second mode to perform electric field sensing.

3. The system of claim 1, wherein the touch screen processor is configured to repeatedly switch between the first and second modes.

4. The system of claim 1, further comprising:
an application processor configured to execute one or more applications that are configured to use a location of the object during execution.

5. The system of claim 1, wherein:
the electrodes comprise first electrodes arranged in rows and second electrodes arranged in columns; and
each electrode comprises multiple conductive pads that are electrically coupled together.

6. An apparatus comprising:
a touch screen processor configured to be coupled to multiple electrodes in a touch screen and to use the multiple electrodes to:
detect an object contacting a touch screen or within a first distance from the touch screen in a first mode; and
detect the object within a second distance from the touch screen in a second mode, the second distance larger than the first distance;
wherein the touch screen processor is comprised of:
a drive signal generator, wherein the drive signal generator is configured to provide touch screen or electric field sensing drive signals to one or more of the electrodes;
a detections unit, wherein the detection unit receives signals from one or more of the electrodes and is configured to analyze the signals received from one or more of the electrodes and perform capacitive touch screen sensing and electric field sensing;
wherein the touch screen processor in the first mode is configured for:
each of multiple pairs of electrodes, drive one of the electrodes in the pair and measure a mutual capacitance using another of the electrodes in the pair; and
use mutual capacitance measurements to detect the object contacting the touch screen or within the first distance from the touch screen;
wherein the touch screen processor in the second mode is configured to:
drive a first group of the electrodes and measure a self-capacitance of the first group of electrodes; and
use self-capacitance measurements to detect the object within the second distance from the touch screen.

7. The apparatus of claim 6, wherein the processing unit is configured to:
use the multiple electrodes in the first mode to perform capacitive touch screen sensing; and
use the multiple electrodes in the second mode to perform electric field sensing.

8. The apparatus of claim 6, wherein the processing unit is configured to repeatedly switch between the first and second modes.

9. A method comprising:
using multiple pairs of electrodes in a touch screen to detect an object contacting the touch screen or within a first distance from the touch screen in a first mode; and
using a first group of electrodes in the touch screen to detect the object within a second distance from the touch screen in a second mode, the second distance larger than the first distance;
wherein using the multiple pairs of electrodes in the first mode comprises:
for each of multiple pairs of electrodes, driving one of the electrodes in the pair and measuring a mutual capacitance using another of the electrodes in the pair; and
using mutual capacitance measurements to detect the object contacting the touch screen or within the first distance from the touch screen;
wherein using the multiple electrodes in the second mode comprises:
driving a first group of the electrodes and measuring a self-capacitance of the group of electrodes; and
using self-capacitance measurements to detect the object within the second distance from the touch screen.

10. The method of claim 9, further comprising:
repeatedly switching between the first and second modes.

11. The method of claim 9, further comprising:
outputting a first indication in response to detecting the object contacting the touch screen or within the first distance from the touch screen; and
outputting a second indication in response to detecting the object within the second distance from the touch screen.

12. The method of claim 9, wherein:
using the multiple pairs of electrodes in the first mode comprises using the multiple electrodes to perform capacitive touch screen sensing; and
using the first group of electrodes in the second mode comprises using the multiple electrodes to perform electric field sensing.

* * * * *